Aug. 15, 1967    H. W. DIETERT ET AL    3,335,787
AUTOMATIC MOLD TESTING APPARATUS
Filed Aug. 5, 1964    2 Sheets-Sheet 2

INVENTORS
HARRY W. DIETERT
RALPH E. STEINMUELLER
ALEXANDER L. GRAHAM
ATTORNEYS

United States Patent Office 3,335,787
Patented Aug. 15, 1967

3,335,787
AUTOMATIC MOLD TESTING APPARATUS
Harry W. Dietert, Kerrville, Tex., and Ralph E. Steinmueller, Detroit, and Alexander L. Graham, Livonia, Mich., assignors to Harry W. Dietert Co., Detroit, Mich., a corporation of Michigan
Filed Aug. 5, 1964, Ser. No. 387,615
17 Claims. (Cl. 164—150)

The invention relates to mold testing apparatus and refers more specifically to apparatus for automatically testing the properties of granular material such as foundry sand formed into a mold before the finished mold is removed from the flask and pattern in which it is formed and means for controlling the forming of the mold in accordance with the physical properties tested.

In the past, in foundry operations, it has been the procedure to form sand molds over a pattern by jolting and squeezing foundry sand placed in a flask surrounding the pattern. The physical properties of the finished mold have been determined largely in accordance with the length of time the sand is jolted and the squeeze pressure applied thereto. With the prior procedure the mold is subsequently removed from the flask and pattern and the physical properties checked.

The checking of the physical properties of the finished mold only after it has been removed from the flask and pattern is undesirable in that should the mold not measure up to the desired physical properties the mold must usually be broken up and the granular material reformed in the pattern and flask. Testing the physical properties of the mold in the flask would be more desirable since if the physical properties are not in accordance with the desired physical properties the jolting and/or squeezing could be continued until the physical properties of the mold are in accordance with the desired physical properties.

It is therefore one of the objects of the invention to provide improved mold testing apparatus.

Another object of the invention is to provide mold forming apparatus for granular material including structure for testing physical properties of the granular material in the mold forming apparatus and controlling the mold forming in accordance with the physical properties tested.

Another object is to provide apparatus as set forth above wherein the structure for testing the physical properties of the mold includes structure for testing the permeability of the mold.

Another object is to provide apparatus as set forth above wherein the structure for testing the physical properties of the mold includes structure for testing the green strength of the mold.

Another object is to provide structure for testing the permeability of granular material in a mold before the mold is removed from the mold-forming apparatus.

Another object is to provide structure for testing the green strength of granular material in a mold before the mold is removed from the mold-forming apparatus.

Another ebject is to provide mold testing apparatus which is simple in construction, economical to manufacture and efficient in use.

Other objects and features of the invention will become apparent as the description proceeds, especially when taken in conjunction with the accompanying drawings, illustrating a preferred embodiment of the invention, wherein.

With particular reference to the figures of the drawings, one embodiment of the present invention will now be considered in detail.

Figure 1:
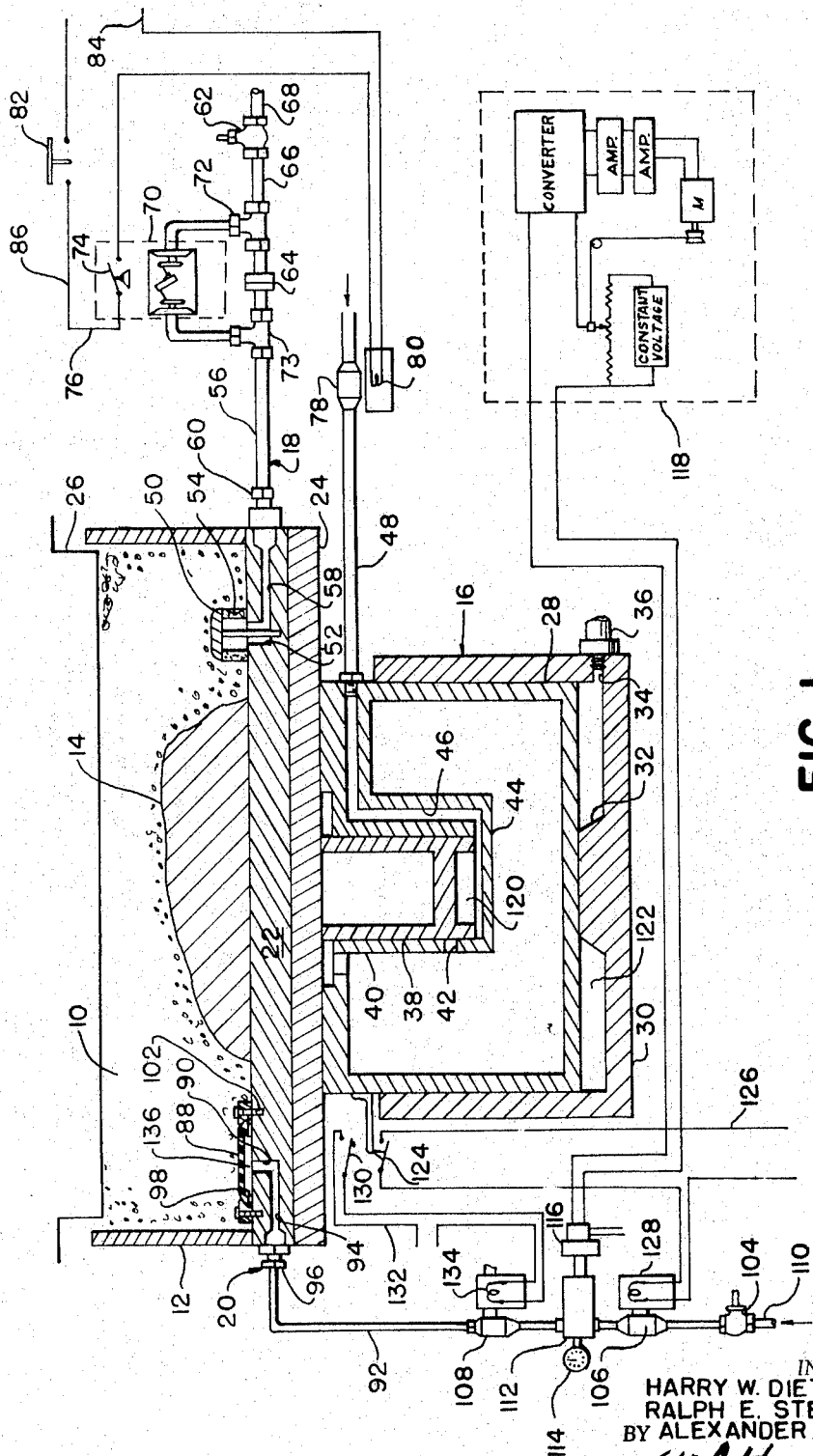
FIGURE 1 is a diagrammatic section view of mold forming apparatus including mold testing structure constructed in accordance with the invention in conjunction therewith.

As is shown in FIGURE 1, a mold 10 of granular material is formed in flask 12 over pattern 14 by means of the mold forming apparatus 16. In accordance with the invention, the permeability testing structure 18 and the green strength testing structure 20 are provided in conjunction with the mold forming apparatus 16.

In operation, the sand in the flask 12 is jolted and then squeezed to form a mold 10 over the pattern 14. During the jolting the permeability of the sand forming the mold 10 is continuously tested and the jolting of the mold is stopped when the mold has reached a predetermined permeability. Subsequent to the testing of the permeability of the mold 10 with the permeability testing structure 18, the green strength of the mold 10 is tested by the green strength testing structure 20 so that the mold 10 will not be removed from flask 12 or pattern 14 without having a predetermined strength as well as a predetermined permeability.

More specifically, as illustrated in FIGURE 1, the pattern 14 is positioned on a pattern plate 22 which also supports the flask 12. The pattern plate 22 is set upon a table 24 immediately beneath a squeeze board 26 shaped to extend into the flask 12 on movement of the table 24 toward the squeeze board 26.

The table 24 is supported on a squeeze piston 28 reciprocably mounted in the squeeze cylinder 30. The squeeze cylinder 30 is provided with an abutment 32 therein on which the squeeze piston 28 rests in the lowermost position thereof. The squeeze cylinder 30 is connected through passage 34 to a squeeze pressure inlet and outlet conduit 36. Squeeze pressure is provided by either a hydraulic or pneumatic pressure source (not shown).

A jolt piston 38 is reciprocally mounted in the jolt cylinder 40 formed in the squeeze piston 28 as shown best in FIGURE 1. The jolt cylinder 40 is provided with the opening 42 extending transversely therethrough at some fixed distance above the bottom 44 of the jolt cylinder. The bottom of the jolt cylinder 40 is connected through passage 46 to the flexible pneumatic pressure conduit 48.

The permeability testing structure 18 includes the permeability head 50 secured in the recess 52 in pattern plate 22 and the powdered metal or slotted tube 54 held in position in the flask 12 on pattern plate 22 by the permeability head 50. The recess 52 and the interior of the tube 54 are connected to the flexible tube 56 through the passage 58 in the pattern plate 22 and the quick disconnect coupling 60.

The permeability testing structure 18 further includes the pressure regulator 62 and an orifice plate 64 connected in the pneumatic conduit 66. The pneumatic conduit 66 is connected at end 68 to an air supply (not shown). The pressure actuated switch 70 is connected in conduit 66 to opposite sides of the orifice plate 64 by couplings 72 and 73.

The pressure actuated switch 70 includes the contacts 74 in the electric circuit 76 to the solenoid actuated valve 78 operable to regulate the air passed into and out of the jolt cylinder 40 through the flexible conduit 48. Besides the switch contacts 74 and the solenoid 80 of the solenoid actuated valve 78 the circuit 76 includes a jolt start pushbutton 82 and the electrical conductors 84 and 86 as shown best in FIGURE 1.

The green strength testing structure 20 includes the rubber sheet 88 positioned over recess 90 in pattern plate 22 which is connected to the flexible conduit 92 through the passage 94 in the pattern plate 22 and the quick disconnect coupling 96. The rubber sheet 88 is held on the pattern plate 22 by the annular gripping abutments 98 and 100 which may be secured to the pattern plate by convenient means such as bolts 102.

The green strength testing structure 20 further includes the pressure regulator 104 and solenoid actuated pneumatic valves 106 and 108 in series in the air supply conduit 110. The constant volume tank 112 having a pressure gage which may be calibrated in terms of green strength of the mold 10 connected thereto is positioned between the solenoid actuated pneumatic valves 106 and 108 in conduit 110. As shown, a pressure electric transducer 116 may be connected to the constant volume tank 112 to provide an output voltage representative of the pressure in tank 112 for the operation of a standard recorder 118 to record the green strength of the mold 10 as determined by the pressure in the constant volume tank 112. The signal from the pressure electric transducer 116 could, of course, be used to control the operation of the mold forming apparatus 16 as desired in accordance with the green strength of the mold 10.

In overall operation of the mold forming apparatus 16 the flask 12 is positioned on the pattern plate 22 on table 24 beneath the squeeze board 26 and foundry sand is poured over the pattern 14. The start jolt push-button 82 is depressed to complete the circuit 76 at which time the solenoid actuated valve 78 is opened to allow air under pressure through conduit 48.

The air in conduit 48 proceds through passage 46 into chamber 120 beneath the jolt piston 38. Pressure in the chamber 120 will cause the jolt piston 38 to rise, raising the table 24 until the jolt piston 38 raises sufficiently so that the bottom thereof passes the opening 42. The pressure in chamber 120 is then released through the opening 42 and the jolt piston returns due to gravity to the lower position thereof as shown providing a jolt to the sand in the flask and compacting the sand about the pattern 14. This operation of the jolt piston is repeated until the solenoid actuated valve 78 is turned off.

The circuit to the solenoid actuated valve 78 will be broken by contacts 74 when the pressure drop across the orifice plate 64 in conduit 68 is below a predetermined pressure drop which indicates a predetermined permeability for the mold 10 formed in the flask 12. As the sand of the mold 10 becomes less and less permeable due to jolting and consequent compacting of the sand less and less pressure will be dissipated through the tube 54 to raise the pressure in the recess 52, passage 58 and coupling 73. The pressure at coupling 72 is maintained constant by the regulator 62.

Thus, as the sand becomes less permeable permitting less of the air in the recess 52 to pass out of the tube 54 the pressure at coupling 73 approaches the pressure at coupling 72 and at a predetermined pressure difference across switch 70 the switch operates to open the contacts 74 and break the circuit to the solenoid 80 closing valve 78 and stopping jolting of the mold 10.

After the jolting operation just described is accomplished, squeeze pressure is admitted to chamber 122 through conduit 36 to cause the squeeze piston 28 to rise in squeeze cylinder 30 and squeeze the sand in the flask 12 to further compact the sand about the pattern 14 and form mold 10.

During the squeezing of the mold 10 the switch 124 in the electric circuit 126 for energizing solenoid 128 of the solenoid actuated valve 106 is open whereby valve 106 is open to permit air under a regulated pressure from regulator 104 to fill the constant volume tank 112. As the cylinder 28 rises in the piston 30 the switch 124 is closed completing the circuit 126 to energize solenoid 128 and close the solenoid actuated valve 106 sealing the constant volume of tank 112 at a regulated predetermined air pressure.

As the cylinder 28 continues to rise the switch 130 in circuit 132 for energizing the solenoid 134 of solenoid actuated valve 108, which valve has perviously been closed, opens causing the valve 108 to open.

At this time the volume of air in the tank 112 under the regulated pressure will be considerably diminished in accordance with the air passed through the conduit 92, passage 94 and recess 90 into the chamber 136 beneath the rubber sheet 88. The exact air pressure in the constant volume tank 112 will be determined by the amount which the rubber sheet 88 expands into the sand of the mold 10 and will thus be an indication of the green mold strength.

The change in pressure in the constant volume tank 112 will, of course, be recognized by the pressure electric transducer 116. The pressure electric transducer 116 will provide an electric signal for the recorder 118 representative of the green strength of the mold 10. The molding operation may thus be controlled in accordance with mold green strength with the mold 10 still in the flask 12 and on the pattern 14.

Figure 2:
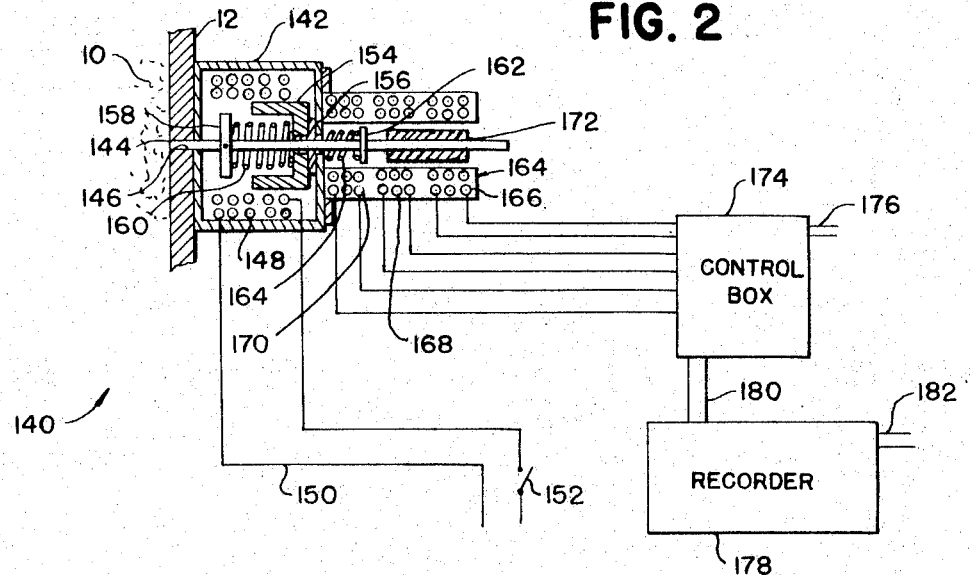
FIGURE 2 is a diagrammatic section view of structure for testing the green strength of granular material in a mold while the mold is in mold forming structure for use in conjunction with mold forming structure as illustrated in FIGURE 1.

The green strength testing structure 20 may be replaced by the green strength testing structure 140 illustrated in FIGURE 2 if desired. The green strength testing structure 140 includes the housing 142 secured to the side of the flask 12 or perhaps secured to the pattern plate 22 in a convenient location so that the penetrating rod 144 may pass through opening 146 into engagement with the sand of the mold 10 on actuation of the structure 140.

The structure 140 further includes the solenoid coil 148 energizable through circuit 150 on closing of the switch 152, cylindrical core 154 rigidly secured to the rod 144 through coupling member 156, limiting abutment 158, spring 160, spring retaining abutment 162, and spring 164 assembled as shown in FIGURE 2. The low voltage differential transformer 164 including the coils 166, 168 and 170 secured to the housing 142 and the core 172 secured to the rod 144 are also part of structure 140. Coils 166, 168 and 170 are connected to the control box 174 which is provided with electrical energy through the conductors 176. Control box 174 is connected to the recorder 178 through the electric conductors 180. Actuating energy is provided for the recorder 178 through conductors 182.

In operation of the green strength testing structure 140 the switch 52 is closed to energize the solenoid 148. The solenoid core 154 is thus drawn toward the flask 12 until the open end thereof seats on the housing 142. A uniform pressure is thus applied through the spring 160 to the limiting abutment 158 and to the penetrating rod 144.

Movement of the rod 144 produces similar linear movement of the core 172 of the low voltage differential transformer 164. The signal from the low voltage differential transformer coils 166, 168 and 170 due to movement of the core 172 is transmitted to the control box 174 where in the usual manner it is used to produce a signal representative of the movement of the core 172 which may be recorded by the recorder 178 to provide an indication of movement of the core 172 which is in accordance with the penetration of the mold 10 by the rod 144 or in other words in accordance with the mold green strength as desired.

The limiting abutment 158 serves to limit the penetration of the rod 144 into the mold 10 with very weak molds. On opening of the switch 152 the core 172 and rod 144 are returned to the position illustrated in FIGURE 2 by the spring 164 acting against the abutment 162. In the withdrawn position the rod 144 is positioned exactly flush with the interior of the flask 12 as shown in FIGURE 2 due to the seating of the coupling member 156 on the housing 142.

While one embodiment of the present invention and a modification thereof have been considered in detail, it will be understood that other embodiments and modifications of the invention are contemplated. It is the intention to include all modifications and embodiments of the invention as are defined by the appended claims within the scope of the invention.

What we claim as our invention is:

1. Mold forming apparatus including a flask, a pattern within the flask, means operably associated with the flask and pattern for forming a granular material mold in the flask over the pattern and means extending into the flask for testing at least one physical property of the mold with the mold in position on the pattern.

2. Structure as set forth in claim 1 wherein the means for testing at least one physical property of the mold comprises permeability testing structure.

3. Structure as set forth in claim 1 wherein the means for testing at least one physical property of the mold comprises mold green strength testing structure.

4. Structure as set forth in claim 3 wherein the mold green strength testing structure comprises a penetrating rod positioned adjacent the mold, a solenoid surrounding the penetrating rod, a spring operably associated with the penetrating rod for urging the penetrating rod into the mold in response to movement of the solenoid core toward the mold, mold green strength recording apparatus and a linear variable differential transformer having a core secured to the penetrating rod and coils connected to the mold green strength recording apparatus.

5. Mold forming apparatus comprising a pattern plate, a molding flask supported on the pattern plate, a pattern on the pattern plate within the flask, a squeeze board positioned above the pattern plate, a table supporting the pattern plate, means connected to the pattern plate for jolting the pattern plate, means connected to the pattern plate for urging the pattern plate toward the squeeze board of squeezing a mold being formed in the flask over the pattern, structure supported by the table and extending into the flask for testing the permeability of a mold being formed in the flask and for controlling the jolting of the pattern plate in accordance with the permeability of a mold being formed and structure for testing and indicating the green strength of a mold being formed.

6. Structure as set forth in claim 5 wherein the mold green strength testing structure comprises a penetrating rod positioned adjacent the mold, a solenoid surrounding the penetrating rod, a spring operably associated with the penetrating rod for urging the penetrating rod into the mold in response to movement of the solenoid core toward the mold, mold green strength recording apparatus and a linear variable differential transformer having a core secured to the penetrating rod and coils connected to the mold green strength recording apparatus.

7. Permeability testing structure for use in testing mold permeability and the like comprising a permeable member, a source of air at a regulated pressure, an orifice plate, means for connecting the air under a regulated pressure to one side of the orifice plate, means for connecting the other side of the orifice plate to the permeable member and means for indicating a predetermined pressure drop across the orifice plate.

8. Mold green strength testing structure comprising a chamber one side of which is a rubber diaphragm adapted to be positioned in contact with a mold, a pressure regulator, a first valve, a constant volume tank and a second valve, a conduit connecting the first valve, tank and second valve in series between a pressure source and the chamber, means for sequentially closing the first valve and opening the second valve and means for indicating the pressure in the tank.

9. Mold forming apparatus including a flask, a pattern within the flask, means operably associated with the flask and pattern for forming a granular material mold in the flask over the pattern, means extending into the flask for testing at least one physical property of the mold with the mold in position on the pattern and means for controlling the forming of the mold in accordance with the physical property tested.

10. Mold forming apparatus comprising a pattern plate, a pattern supported on the pattern plate, a molding flask surrounding the pattern also supported on the pattern plate, a pressure plate positioned above the pattern plate, pattern and flask, a table supporting the pattern plate, a squeeze cylinder positioned beneath the table, a squeeze piston reciprocally mounted within the squeeze cylinder, means for admitting air under pressure into the squeeze cylinder beneath the squeeze piston for moving the squeeze piston toward the pressure plate, a jolt cylinder supported by the squeeze piston, a jolt piston reciprocally positioned within the jolt cylinder and connected to the table, means for admitting air under pressure into the jolt cylinder beneath the jolt piston for moving the jolt piston toward the pressure plate and means for relieving the air pressure beneath the jolt piston on movement of the jolt piston a predetermined distance toward the pressure plate, means operably associated with the pattern plate, flask and pattern and extending into the flask for testing the permeability of granular material within the flask as it is formed about the pattern, means operably associated with the permeability sensing means for controlling the means for admitting air into the jolt cylinder in accordance with the permeability of granular material within the flask and separate means operably associated with the pattern plate, flask and pattern for sensing the green strength of granular material within the flask and providing an indication thereof.

11. Mold forming apparatus including a flask, a pattern within the flask, means operably associated with the flask and pattern for forming a granular material mold in the flask over the pattern, and permeability testing structure extending into the flask for testing the permeability of the mold with the mold in position on the pattern, comprising a permeable member positioned in the mold, a source of air at a regulated pressure, an orifice plate, means for connecting the air under a regulated pressure to one side of the orifice plate, means for connecting the other side of the orifice plate to the permeable member, and means for indicating a predetermined pressure drop across the orifice plate.

12. Mold forming apparatus including a flask, a pattern within the flask, means operably associated with the flask and pattern for forming a granular material mold in the flask over the pattern, and mold green strength testing structure extending into the flask for testing the green strength of the mold with the mold position on the pattern, comprising a chamber one side of which is a rubber diaphragm positioned in contact with said mold, a pressure regulator, a first valve, a constant volume tank, and a second valve, a conduit connecting the first valve, tank, and second valve in series between a pressure source and the chamber, means for sequentially closing the first valve and opening the second valve, and means for indicating the pressure in the tank.

13. Mold forming apparatus comprising a pattern plate, a molding flask supported on the pattern plate, a pattern on the pattern plate within the flask, a squeeze board positioned above the pattern plate, a table supporting the pattern plate, means connected to the pattern plate for jolting the pattern plate, means connected to the pattern plate for urging the pattern plate toward the squeeze board for squeezing a mold being formed in the flask over the pattern, structure supported by the table and extending into the flask for testing the permeability of a mold being formed in the flask and for controlling the jolting of the pattern plate in accordance with the permeability of a mold being formed, comprising a permeable member positioned in the mold, a source of air at a regulated pressure, an orifice plate, means for connecting the air under a regulated pressure to one side of the orifice plate, means for connecting the other side of the orifice plate to the permeable member, and means for indicating a predetermined pressure drop across the orifice plate and structure for testing and indicating the green strength of a mold being formed.

14. Mold forming apparatus comprising a pattern plate, a molding flask supported on the pattern plate, a pattern on the pattern plate within the flask, a squeeze board positioned above the pattern plate, a table supporting the pattern plate, means connected to the pattern plate for jolting the pattern plate, means connected to the pattern plate for urging the pattern plate toward the squeeze board for squeezing a mold being formed in the flask over the pattern, structure supported by the table and extending into the flask for testing the permeability of a mold being formed in the flask and for controlling the jolting of the pattern plate in accordance with the permeability of a mold being formed and structure for testing and indicating the green strength of a mold being formed, comprising a chamber one side of which is a rubber diaphragm positioned in contact with said mold, a pressure regulator, a first valve, a constant volume tank, and a second valve, a conduit connecting the first valve, tank, and second valve in series between a pressure source and the chamber, means for sequentially closing the first valve and opening the second valve, and means for indicating the pressure in the tank.

15. Mold forming apparatus comprising a pattern plate, a pattern supported on the pattern plate, a molding flask surrounding the pattern also supported on the pattern plate, a pressure plate positioned above the pattern plate, pattern, and flask, a table supporting the pattern plate, a squeeze cylinder positioned beneath the table, a squeeze piston reciprocally mounted within the squeeze cylinder, means for admitting air under pressure into the squeeze cylinder beneath the squeeze piston for moving the squeeze piston toward the pressure plate, a jolt cylinder supported by the squeeze piston, a jolt piston reciprocally positioned within the jolt cylinder and connected to the table, means for admitting air under pressure into the jolt cylinder beneath the jolt piston for moving the jolt piston toward the pressure plate, and means for relieving the air pressure beneath the jolt piston on movement of the jolt piston a predetermined distance toward the pressure plate, means operably associated with the pattern plate, flask, and pattern and extending into the flask for testing the permeability of granular material within the flask as it is formed about the pattern and for controlling the means for admitting air into the jolt cylinder in accordance with the permeability of granular material within the flask, comprising a passage extending through the pattern plate, one end of which opens into the flask and the other end of which opens outside of the flask, a cylindrical permeable member positioned over the one end of the passage, a cap over the end of the cylindrical permeable member, an air conduit connected to the other end of the passage, means for supplying air at a regulated pressure through the air conduit, an orifice plate in the air conduit between the means for supplying air at a regulated pressure and the other end of the passage, a pressure responsive electrical switch connected to the conduit on opposite sides of the orifice plate, an air conduit for supplying air under pressure to the jolt cylinder, a solenoid operated valve in the air conduit, and an electric circuit for energizing the solenoid operated valve including the pressure responsive switch, and separate means operably associated with the pattern plate, flask, and pattern for sensing the green strength of granular material within the flask and providing an indication thereof.

16. Mold forming apparatus comprising a pattern plate, a pattern supported on the pattern plate, a molding flask surrounding the pattern also supported on the pattern plate, a pressure plate positioned above the pattern plate, pattern, and flask, a table supporting the pattern plate, a squeeze cylinder positioned beneath the table, a squeeze piston reciprocally mounted within the squeeze cylinder, means for admitting air under pressure into the squeeze cylinder beneath the squeeze piston for moving the squeeze piston toward the pressure plate, a jolt cylinder supported by the squeeze piston, a jolt piston reciprocally positioned within the jolt cylinder and connected to the table, means for admitting air under pressure into the jolt cylinder beneath the jolt piston for moving the jolt piston toward the pressure plate and means for relieving the air pressure beneath the jolt piston on movement of the jolt piston a predetermined distance toward the pressure plate, means operably associated with the pattern plate, flask, and pattern and extending into the flask for testing the permeability of granular material within the flask as it is formed about the pattern, means operably associated with the permeability sensing means for controlling the means for admitting air into the jolt cylinder in accordance with the permeability of granular material within the flask and separate means operably associated with the pattern plate, flask, and pattern for sensing the green strength of granular material within the flask and providing an indication thereof, comprising a passage extending through the pattern plate, one end thereof opening into the flask and the other end thereof opening outside of the flask, a rubber diaphragm secured over the one end of the passage, an air conduit connected to the other end of the passage, means for supplying air at a regulated pressure to the air conduit, a pair of solenoid operated valves within the air conduit between the means for supplying regulated air thereto and the other end of the passage, an air tank positioned between the solenoid operated valve in the conduit, a pressure indicator gage connected to the air tank, electric circuits for actuating the solenoid valves, and means connected to the squeeze piston for actuating the electric circuits to first close the solenoid actuated valve upstream of the tank with respect to the rubber diaphragm and then open the solenoid actuated valve downstream of the tank with respect to the rubber diaphragm on movement of the squeeze piston toward the pressure plate.

17. Mold forming apparatus comprising a pattern plate, a pattern supported on the pattern plate, a molding flask surrounding the pattern also supported on the pattern plate, a pressure plate positioned above the pattern plate, pattern, and flask, a table supporting the pattern plate, a squeeze cylinder positioned beneath the table, a squeeze piston reciprocally mounted within the squeeze cylinder, means for admitting air under pressure into the squeeze cylinder beneath the squeeze piston for moving the squeeze piston toward the pressure plate, a jolt cylinder supported by the squeeze piston, a jolt piston reciprocally positioned within the jolt cylinder and connected to the table, means for admitting air under pressure into the jolt cylinder beneath the jolt piston for moving the jolt piston toward the pressure plate and means for relieving the air pressure beneath the jolt piston on movement of the jolt piston a predetermined distance toward the pressure plate, means operably associated with the pattern plate, flask, and pattern and extending into the flask for testing the permeability of granular material within the flask as it is formed about the pattern, means operably associated with the permeability sensing means for controlling the means for admitting air into the jolt cylinder in accordance with the permeability of granular material within the flask and separate means operably associated with the pattern plate, flask, and pattern for sensing the green strength of granular material within the flask and providing an indication thereof, comprising a housing secured to the flask, a solenoid core positioned within the solenoid coil, a shaft extending through the solenoid core, the housing, and the flask, a linear variable differential transformer coil secured to the housing, a linear variable differential transformer core positioned within the linear variable differential transformer coil and mounted on one end of the shaft, a collar on the shaft between the linear variable differential transformer core and the housing, resilient means positioned between the collar and the housing for urging the linear variable differential transformer core away from the housing, a second collar on the shaft within the housing so related to the other end of the shaft that with the second collar in engagement with the housing due to the bias applied to the shaft by the resilient means that the other end of the shaft is flush with the inner surface of the flask, a third collar on said shaft within the housing and other resilient means extending between the third collar and the core of the solenoid whereby on energization of the solenoid the core of the solenoid is moved to place the open end thereof in contact with the housing adjacent the flask so that the second resilient means places a uniform bias on the shaft and the one end of the shaft penetrates the granular material within the flask a distance determined by the green strength thereof, and a recorder connected to the linear variable differential transformer coil.

References Cited

UNITED STATES PATENTS

| | | | |
|---|---|---|---|
| 2,647,397 | 8/1953 | Dietert | 73—38 |
| 2,791,120 | 5/1957 | Dietert et al. | 22—89 |
| 2,825,946 | 3/1958 | Dietert et al. | 22—89 |
| 2,835,939 | 5/1958 | Beech | 22—26 |
| 2,858,696 | 11/1958 | Underwood | 73—83 |
| 2,867,870 | 1/1959 | Hines | 22—129 |
| 3,136,010 | 6/1964 | Dietert et al. | 22—217 |
| 3,156,112 | 11/1964 | Dietert | 73—81 |
| 3,172,285 | 3/1965 | Dietert et al. | 73—38 |

J. SPENCER OVERHOLSER, *Primary Examiner.*

R. D. BALDWIN, *Assistant Examiner.*